United States Patent [19]
Veazey et al.

[11] Patent Number: 4,690,982
[45] Date of Patent: Sep. 1, 1987

[54] EPOXIDIZED POLY(ALLOOCIMENE)

[75] Inventors: Richard L. Veazey, East Windsor, N.J.; Kathryn S. Hayes, Norristown, Pa.

[73] Assignee: Union Camp Corporation, Wayne, N.J.

[21] Appl. No.: 927,232

[22] Filed: Nov. 5, 1986

[51] Int. Cl.$^4$ .............................................. C08F 8/08
[52] U.S. Cl. .................... 525/331.9; 525/359.4; 525/385; 525/386; 525/387; 525/388; 526/290; 526/340.3
[58] Field of Search ............... 525/331.9; 526/290, 526/340.3

[56] References Cited
U.S. PATENT DOCUMENTS

| | | | |
|---|---|---|---|
| 2,406,575 | 8/1946 | Young et al. .................... | 525/331.9 |
| 3,278,641 | 10/1966 | Bell, Jr. ............................ | 526/340.3 |
| 3,373,149 | 3/1968 | Doyle, Jr. .......................... | 528/393 |
| 3,715,341 | 2/1973 | Velzmann ......................... | 528/374 |
| 3,929,850 | 12/1975 | Streck et al. ..................... | 526/279 |
| 3,939,131 | 2/1976 | Morikawa et al. ................ | 526/308 |
| 4,169,116 | 9/1979 | Trotter et al. .................... | 525/210 |
| 4,229,549 | 10/1980 | Usami et al. ..................... | 525/308 |
| 4,282,337 | 8/1981 | Roggero et al. .................. | 525/285 |
| 4,388,359 | 9/1981 | Trotter et al. .................... | 525/232 |
| 4,524,187 | 6/1985 | Greco et al. ...................... | 525/342 |

Primary Examiner—Joseph L. Schofer
Assistant Examiner—Bernard Lipman
Attorney, Agent, or Firm—Edward J. Sites

[57] ABSTRACT

Epoxidized poly(alloocimene) is described. The polymer is useful as a cross-linker (curing agent) for polyester, polyether and polyurethane coating compositions.

3 Claims, No Drawings

EPOXIDIZED POLY(ALLOOCIMENE)

The invention relates to epoxidized polymers prepared from 2,3- and 6,7-poly(alloocimene).

BACKGROUND OF THE INVENTION

Epoxidation of polymers has been known in the prior art for some time. For example, Daniel Swern, in *Encyclopedia of Polymer Science*, Vol. 6, H. F. Mark, N. G. Gaylord, and N. M. Bikales, eds., John Wiley and Sons, New York, 1967, pp. 83–102, reported a procedure for epoxidizing polybutadiene in which the polymer was treated with peracetic acid. Recently, Osamu Hayashi, Hideo Kurihara, and Yukio Matsumoto reported in U.S. Pat. No. 4,528,340 that hydrophilic polymers were prepared which were useful in coatings by epoxidizing polybutadiene and then opening the epoxide by reaction with carboxylic acids in the presence of tertiary amines.

SUMMARY OF THE INVENTION

The invention comprises epoxidized 2,3- and 6,7-poly(alloocimene).

The polymers of the invention are characterized in part by glass transition temperatures higher than the parent poly(alloocimene). The polymers of the invention are reactive with amines, alcohols, acids and anhydrides. They are, accordingly, useful as cross-linkers or curing agents in polyester, polyether, polyurethane and like synthetic polymeric based coating compositions.

BRIEF DESCRIPTION OF THE PREFERRED EMBODIMENTS OF THE INVENTION

The preferred compounds of the instant invention are derivatives of alloocimene polymers which may comprise mixtures of chain units of the formulae:

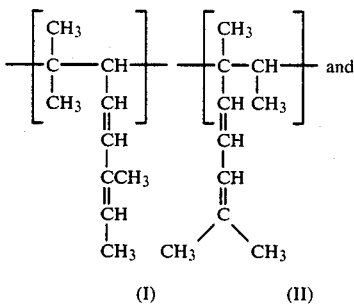

(I)         (II)

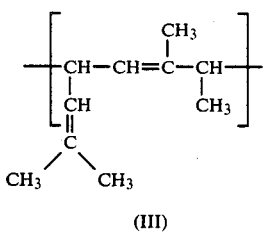

(III)

These poly(alloocimene) polymers comprise mixtures of a majority of chain moieties I and II as a group and a minority of chain moiety III. We define 2,3- and 6,7-poly(alloocimene) as a composition consisting of greater than 50 weight percent of 2,3-poly(alloocimene), (I), and 6,7-poly(alloocimene), (II), and less than 50 weight percent of 4,7-poly(alloocimene), (III).

The 2,3- and 6,7-poly(alloocimene) may be prepared in the following manner: substantially anhydrous alloocimene is added slowly to a catalyst system comprised of an active metal catalyst component dispersed in a substantially anhydrous ether component under an inert gas atmosphere. Controlled reaction by slow alloocimene addition is necessary because the polymerization is highly exothermic. It is preferred that the alloocimene feed be essentially free of peroxides, water, and alcohols. The metal polymerization catalyst components may be any alkali metal or calcium, substantially free of oxides or other contaminants and being present at a concentration of less than about 10 mole percent of the alloocimene. The active metal catalyst component may be present as spheres, wire, foil, or finely divided dispersion and may be in the pure state, as a mixture or an alloy, or as a solution with aromatic hydrocarbons, such as naphthalene, 2-methylnaphthalene, and the like.

The ether components used in the polymerization are aliphatic or cycloaliphatic ethers. The ethers are preferred in amounts of greater than about 5 weight percent of the alloocimene. The ether components most preferred are tetrahydrofuran and 1,2 dimethoxylethane. Inert hydrocarbon solvents and diluents may be present, for example, benzene, toluene, xylene, ethylbenzene, pentane, hexane, cyclohexane, heptane, octane, nonane, limonene, para-cymene, and the like, or mixtures thereof.

The polymerizations may be carried out at temperatures of from about −78° C. to about 100° C., with reaction times of from about 10 minutes to about 500 hours. Most preferably the polymerizations are carried out at temperatures of from about −30° C. to about 60° C., with reaction times of from about 1 to about 8 hours.

When the polymerization is complete, addition of a proton source, for example, water, an acid, an alcohol, or mixtures thereof, in molar excess of the alkali metal catalysts terminates the reaction and thereby introduces hydrogen atoms at the end or ends of the polymeric chain.

Following the polymerization, the reaction mixture containing the poly(alloocimene) is subjected to distillation to remove the ether solvent, unreacted reagent. Care must be taken not to exceed a temperature of about 150° C. in the distillation pot containing the polymer, otherwise excessive thermal degradation of the polymer will occur. The polymer may be discharged while still molten onto a polytetrafluoroethylene coated glass fabric or other suitable surface and allowed to cool. The cooled polymer may then be packaged, preferably under a nitrogen atmosphere to protect it from oxidation.

A second polymer isolation procedure, although not requisite, may be employed especially for higher molecular weight poly(alloocimene). This method involves cautious transfer of the terminally active polymer and diluents into a large excess of a nonsolvent, such as methanol, or the like. The poly(alloocimene) precipitates as a white solid. Collecting, redissolving, and reprecipitating the poly(alloocimene) solid several times gives, after finally drying, a poly(alloocimene) free of low molecular weight impurities. The dried, isolated poly(alloocimene) is then packaged and stored in a nitrogen atmosphere.

It is advantageous to add an antioxidant, such as 2,6-di-tertiary-butyl-4-methylphenol or the like, prior to distillative isolation, or in the final precipitation solvent to protect the poly(alloocimene) from oxidizing.

Alternatively, the poly(alloocimene) need not be isolated but the reaction mixture containing the polymer after the catalyst has been neutralized, may be used directly to prepare the epoxidized poly(alloocimene) of the invention.

The poly(alloocimene) employed to prepare the polymers of the invention is advantageously the homopolymer of alloocimene having a weight average molecular weight of from about 500 to 100,000 and which contains repeating or recurring chain moieties of the formulae (I), (II) and (III) given above.

The poly(alloocimene) may be epoxidized by a number of methods known in the prior art. In general, methods which epoxidize other unsaturated polymers are useful in epoxidizing poly(alloocimene); see for example Daniel Swern supra. Methods that employ hydrogen peroxide and the lower aliphatic acids and those that employ the preformed peroxy acids are preferred.

Generally it is preferable to carry out the epoxidation in the presence of an inert solvent that dissolves both the poly(alloocimene) and the epoxidized poly(alloocimene) product. Incomplete solution of poly(alloocimene) initially may lead to incomplete reaction. Incomplete solution of the oxidized product may result in a premature termination of the epoxidation reaction. Methylene chloride and toluene have been found to be advantageous solvents.

Reaction temperatures and acidities may be maintained as low as is practical to prevent undesired by-products from forming. For example high temperatures and strongly acidic media promote cleavage of the epoxide ring and formation of esters and alcohols. At high temperatures the decomposition of peroxy acetic acid is sufficiently rapid so as to give low epoxides yields. Preferably, the epoxidation is carried out at a temperature within the range of from about 0° C. to 150° C. yields of epoxides. Preferably, the epoxidation is carried out at a temperature within the range of from about 0° C. to 150° C.

In a typical epoxidation, poly(alloocimene), a metal catalyst or base, and the appropriate solvent, i.e. either methylene chloride or toluene are added to a round bottom flask equipped with a thermometer and an addition funnel. The mixture is stirred to dissolve the poly(alloocimene), and conditioned at the reaction temperature prior to addition of the epoxidizing reagent. The epoxidizing agent is added at such a rate that the reaction temperature is maintained within a few degrees of the desired reaction temperature. Progress of the reaction may be observed by conventional analytical technique for determining the presence of the oxirane moiety. The reaction is terminated by washing the organic layer thoroughly with water, with either aqueous base and/or aqueous acid, and finally with water. The organic layer is dried. Removing the solvent at reduced pressures leaves the epoxidized poly(alloocimene) as a residue.

The polymer compounds of the invention possess a wide variety of molecular weights. Representative molecular weights are in the range of from about 600 to about 100,000.

The structural units of the epoxidized poly(alloocimene) polymer of the instant invention are difficult to definitively assign, since the poly(alloocimene) itself is comprised of a mixture of three polymer chain structural units and epoxidation can occur at one or both double bonds of each unit.

The following examples describe the manner and the process of making and using the invention and set forth the best mode contemplated by the inventors for carrying out the invention.

The amount of oxirane oxygen present in the polymer after the epoxidation reaction is determined by titrating the polymer epoxide with hydrogen bromide and is reported in meq/gram sample. Oxirane functional groups which open during the course of the reaction to esters or alcohols are not detected by this method but can be seen by infrared spectroscopy. The theoretical value of one epoxide per poly(alloocimene) unit structure is 6.6 meq/g. Values for the epoxidized poly(alloocimene) examples are reported in the table below and vary from 0.45 to 0.93 meq/g. Example 1 had an HBr number of 0.93, which implies that about $(0.93/2 \times 6.6 \times 100)$ or 7% of the total number of double bonds formed epoxides.

Evidence that the epoxidation occurs on the pendant side chains of poly(alloocimene) is obtained from ultraviolet spectral data. Sodium polymerized poly(alloocimene) typically has an absorption maximum around 245 nm with polymer unit molar absorptivity of greater than 10,000. When poly(alloocimene) was epoxidized this absorptivity at 245 nm dropped to lower values. Example 1 had an absorptivity around 5400 upon reaction with epoxidizing reagents.

PREPARATION 1

To a clean, oven-dried, three-neck, round-bottom flask equipped with a claisen adapter, thermometer onto which was placed a temperature sensing device, nitrogen inlet, pressure equalizing addition funnel, a reflux condensor into which was inserted an inert gas exit adapter, and a Nicrome wire stirrer, was added sodium shot (46 g) and toluene (75 ml) which had been dried and distilled from calcium hydride. A nitrogen blanket was maintained in the reaction flask at all times. Heat was applied and stirring initiated. The toluene was allowed to gently reflux for 30 minutes, and then it was cooled to less than 50° C. At this point tetrahydrofuran (252 ml) was added. A preweighed sample of the alloocimene (1500 ml, 42.4% pure) which had been dried over calcium hydride and distilled, was charged to the addition funnel. The polymerization temperature of 25° C. was maintained by applying cooling to the reaction flask with a dry-ice isopropanol bath.

Polymerization was initiated by slowly adding the alloocimene mixture over one hour and forty minutes to the stirred solvent containing sodium metal.

The polymerization was allowed to proceed for an additional 18 hours. The poly(alloocimene) was isolated by transferring about 100 ml portions of the crude product to 50 ml of methanol, adding either about 100 ml of diethyl ether. This solution was thoroughly washed with saturated sodium chloride aqueous solution. The organic solutions were combined and then dried over anhydrous magnesium sulfate and filtered into a round-bottom flask. The solvents were removed at reduced pressures. Any monoterpenes were isolated at approximately 40°-82° C. (at about 10 mm Hg). The distillation was terminated when the temperature in the pot containing the polymer product reached about 147° C. The polymer was poured while hot into a pan, allowed to cool, then stored under nitrogen. The polymer yield was 482 g, about 92% of theory. Data for this polymer is reported in Table 2.

PREPARATION 2

To a clean, dry 2000 ml four-neck round-bottom flask equipped with a Nicrome-wire stirrer, a reflux condensor, a mercury thermometer onto which was attached a temperature sensing device, and a pressure equalizing addition funnel on the top of which was inserted an inert gas inlet tube is added 11.25 g of sodium and 200 ml of toluene while the reaction flask was purged with clean, dry nitrogen. The resulting mixture was stirred and heated to reflux for about two minutes and then immediately cooled to room temperature (25° C.). The toluene was removed and replaced with about 200 ml of anhydrous 1,2-dimethoxyethane. The resulting mixture was cooled to 0° C. with a dry-ice isopropanol bath and the addition of 750 ml of dry crude alloocimene (46.7% pure with the remaining portion being mostly limonene) was begun. The addition rate was slow enough so that the reaction temperature was maintained between 0° and −3° C. with cooling. The addition took about forty minutes to complete.

After four hours liquid chromatographic analysis of a sample of the reaction mixture indicated that the polymerization was essentially complete. The polymerization mixture was transferred to a 2000 ml round-bottom flask, which had a bottom drain and which contained 250 ml of ethanol and 250 ml of toluene. The inside of the round-bottom flask was purged with nitrogen during the transfer operation, and the mixture was stirred with a mechanical stirrer. The excess sodium in the polymerization flask was washed with 50 ml of dry heptane which was subsequently combined with the deactivated organic polymer solution.

The polymer was then precipitated from a large excess of methanol, filtered, and redissolved into toluene. The polymer was reprecipitated from ethanol, filtered and dried in a vacuum oven set at 100° C. at about 5 mm Hg pressure. The yield was about 100% of theoretical. Data for this material are reported in the Table 2 below.

PREPARATION 3

Poly(alloocimene) was prepared by the procedure reported in Preparation 2, supra., except 200 g of dry toluene, 5.6 g of sodium, 150 g of dry 1,2-dimethoxyethane and alloocimene (1500 g, of 46.7% pure alloocimene) were used. The polymer was isolated by adding about 25 g of methanol and enough acetic acid to the polymerization mixture to react with the active polymer and any excess sodium that might be present neutralize solution to a pH of about 7. The 1,2-dimethoxyethane was reclaimed by distillation at 200 mm and up to a pot temperature of 110° C. The polymer mixture was then cooled, washed thoroughly with 375 g of 10% phosphoric acid followed by 300 g of water containing 1 g of sodium hydroxide, in order to adjust the pH to about 7. The remaining organic solvents and terpenes were removed from the poly(alloocimene) by distillation at a 10 mm Hg pressure and up to a poly(alloocimene) temperature of 153° C. The polymer was poured while hot onto a tray and allowed to cool. The properties of this material are reported in Table 2 below.

EXAMPLE 1

The poly(alloocimene) (10 g) of Preparation 1, 0.57 g of sodium acetate, and 75 ml of methylene chloride were weighed into a 250 ml round bottom flask equipped with a thermometer and an addition funnel. The mixture was stirred to dissolve the polymer and then cooled to 0° C. The temperature was kept below 25° C. as 8.5 ml of 35% peracetic acid was added. The mixture was stirred during this process and for an additional 1.5 hours. The mixture was then transferred to a separatory funnel and washed twice with water, once with aqueous sodium bicarbonate, once with aqueous sodium sulfite, and once with water. The organic layer was dried over MgSO$_4$, filtered, and the solvent was distilled at reduced pressures. The weight of the product was 12.5 g.

EXAMPLE 2

Poly(alloocimene), 10 g, of Preparation 2 was reacted with peracetic acid according to the procedure described in Example 1, supra. Approximately 2.42 g of anhydrous sodium acetate and 36.2 ml of 35% peracetic acid were employed. The temperature was maintained between 10° and 25° C. by means of an ice bath. The data for this material are reported in Tables 1 and 2.

EXAMPLE 3

Poly(alloocimene), 10 g, of Preparation 3 was dissolved into 10 ml of methylene chloride within a dry, 500 ml 3-neck round bottom flask equipped with a stirrer, a reflux condenser, and a pressure equalizing addition funnel. A dry nitrogen atmosphere was maintained during both the dissolution and reaction stages of this procedure. To the poly(alloocimene) was added with stirring 26.8 g of meta-chloroperbenzoic acid dissolved in 225 ml of methylene chloride at such a rate that the temperature of reaction was maintained less than 30° C. by means of applying an ice bath to the reaction flask. The temperature was maintained at 13°–35° C. during the one hour period of time after the addition was completed and before termination of the reaction. The reaction was terminated by the slow addition of 175 ml of aqueous 10% sodium sulfite. The flask contents were then transferred to a separatory funnel. The aqueous layer was removed, and the organic layer was washed twice with excess aqueous 10% sodium bicarbonate solution and then twice with saturated aqueous sodium chloride. The organic layer was separated, dried over anhydrous magnesium sulfate, and filtered. The methylene chloride solvent was removed by distillation at reduced pressure to leave 10.9 g of a white solid. The data collected for this materials are reported in the Tables 1 and 2 below.

EXAMPLE 4

Poly(alloocimene), 10 g, of Preparation 2 was reacted with tert-butyl hydroperoxide according to the following procedure. The poly(alloocimene), toluene (75 ml), triethylamine (0.12 g), and vanadyl acetylacetonate (0.32 g) were added to a clean dry 250 ml three-neck round-bottom flask equipped with a Dean-Stark water trap, a thermometer, a stirring bar, and a pressure equalizing addition funnel onto which is affixed an inert gas inlet adapter. Stirring was initiated. A gentle nitrogen was begun through the flask. The mixture was slowly heated to 80° C., and then the hydroperoxide (20.82 g of 70% pure) was slowly added over a 23-minute period. During this addition time the solution changed from green to yellow, and the reaction temperature was increased to about 92° C. by increasing the power to heating mantle. At 94° C. water began to collect in the trap. Over the next 4 hours and 9 minutes the temperature was slowly increased to 110° C. as the water distilled out. About 5.8 ml of water was collected. The reaction mixture was filtered, and dried. The toluene was removed at reduced pressures and temperatures up to 100° C. The product was placed under vacuum of about 5 to 10 mm Hg for about 4.5 hours at 100° C., and then cooled to room temperature. The data obtained on this material are reported in the Tables 1 and 2 below.

TABLE 1

| Sample | Epoxidizing Reagent | Reaction Temperature °C. | Solvent |
|---|---|---|---|
| Example 1 | $CH_3CO_3H$ | 25 | $CH_2Cl_2$ |
| Example 2 | $CH_3CO_3H$ | 10–25 | $CH_2Cl_2$ |
| Example 3 | m-chloroperbenzoic acid | 13–30 | $CH_2Cl_2$ |
| Example 4 | TBHP/VO (acac)$_2$* | 80–110 | Toluene |

*TBHP = tertiary butyl hydroperoxide
VO(acac)$_2$ = vanadyl acetylacetonate

TABLE 2

| Sample | Titration of Epoxides (meq. epoxide per gram polymer) | Percent Epoxide$^a$ | Glass Transition Temperature °C. | Polymer Unit UV Molar Absorption at λ = 246 nm |
|---|---|---|---|---|
| Preparation 1 | — | — | 20 | 13000 |
| Example 1$^{b,c}$ | 0.93 | 7 | 15 | 5400 |
| Preparation 2 | — | — | 18 | 14500 |
| Example 2$^b$ | 0.91 | 7 | 68 | 0 |
| Preparation 3 | — | — | −34 | 13300 |
| Example 3$^b$ | 1.71 | 9 | . | 1020 |
| Preparation 4 | — | — | −34 | 13300 |
| Example 4$^b$ | 0.45 | 3.5 | 18 | 1500 |

$^a$Epoxide rings were determined by titrating with anhydrous HBr in acetic acid.
$^b$Ester and hydroxyl absorptions were present in the infrared spectra of these materials.
$^c$This material had a saponification number of 77.2.

The polymers of the invention may be used as curing agents when added in proportions of from 1 to 10 percent by weight, to polyester coating compositions.

What is claimed is:

1. Epoxidized 2,3- and 6,7-poly(alloocimene).
2. The polymer of claim 1 prepared from the reaction of an epoxidizing reagent with 2,3- and 6,7-poly(alloocimene) comprised of a mixture of greater than 50 weight percent 2,3- and 6,7-poly(alloocimene) and less than 50 weight percent 4,7-poly(alloocimene).
3. The polymer of claim 1 wherein the epoxide number as determined by titration is greater than 3 meq/g sample.

* * * * *